United States Patent
Mosquera et al.

(10) Patent No.: US 10,975,848 B2
(45) Date of Patent: Apr. 13, 2021

(54) SITE-SPECIFIC CUSTOMIZABLE NACELLE FOR A WIND TURBINE

(71) Applicant: General Electric Company, Schenectady, NY (US)

(72) Inventors: Mauricio Giovanny Mosquera, Simpsonville, SC (US); Paul-Michael William Ingold, Enterprise, AL (US)

(73) Assignee: General Electric Company, Schenectady, NY (US)

(*) Notice: Subject to any disclaimer, the term of this patent is extended or adjusted under 35 U.S.C. 154(b) by 61 days.

(21) Appl. No.: 16/357,780

(22) Filed: Mar. 19, 2019

(65) Prior Publication Data
US 2020/0300223 A1    Sep. 24, 2020

(51) Int. Cl.
*F03D 13/20* (2016.01)
*F03D 1/00* (2006.01)

(52) U.S. Cl.
CPC .......... *F03D 13/20* (2016.05); *F03D 1/00* (2013.01); *F05B 2230/21* (2013.01); *F05B 2240/91* (2013.01)

(58) Field of Classification Search
CPC .......... F03D 80/00; F03D 80/80; F03D 13/10; F03D 13/20; F05B 2240/14
See application file for complete search history.

(56) References Cited

U.S. PATENT DOCUMENTS

| | | | |
|---|---|---|---|
| 7,178,406 B2 * | 2/2007 | Gonzalez | G01M 99/008 73/856 |
| 7,857,599 B2 * | 12/2010 | Bagepalli | F03D 13/20 416/244 R |
| 2013/0183162 A1 * | 7/2013 | Cruden | F03D 1/00 416/244 R |
| 2014/0119932 A1 * | 5/2014 | Bell | F03D 1/0675 416/225 |
| 2014/0369845 A1 * | 12/2014 | Ruijter | F03D 80/00 416/224 |

(Continued)

FOREIGN PATENT DOCUMENTS

| | | |
|---|---|---|
| DE | 102010025546 A1 | 12/2011 |
| EP | 3372823 A1 | 9/2018 |
| WO | WO 2010102636 A2 | 9/2010 |

OTHER PUBLICATIONS

European Search Report, dated Aug. 13, 2020 for EP Application No. 20161227.2.

*Primary Examiner* — Nathaniel E Wiehe
*Assistant Examiner* — Jackson N Gillenwaters
(74) *Attorney, Agent, or Firm* — Dority & Manning, P.A.

(57) ABSTRACT

A site-specific customizable nacelle for a wind turbine includes a plurality of walls arranged together to form an inner volume. The walls include a base wall, side walls, a front wall, a rear wall, and a top wall. Each of the walls is constructed of one or more outer skin layers positioned adjacent to one or more inner skin layers and infused together via a resin material. Further, the nacelle includes a plurality of reinforcement members secured to one or more of the plurality of walls on an interior side or an exterior side of at least one of the one or more outer skin layers or the one or more inner skin layers at locations requiring additional reinforcement. As such, the reinforcement members can be tailored according to a particular wind turbine site.

18 Claims, 10 Drawing Sheets

(56) References Cited

U.S. PATENT DOCUMENTS

| | | | |
|---|---|---|---|
| 2015/0152881 A1* | 6/2015 | Tirumalai | F03D 9/25 |
| | | | 415/1 |
| 2015/0258741 A1* | 9/2015 | Leland | F01D 25/243 |
| | | | 415/214.1 |
| 2016/0076522 A1* | 3/2016 | Rohden | F03D 80/82 |
| | | | 416/9 |
| 2019/0271297 A1* | 9/2019 | Kruse | F03D 80/00 |
| 2020/0072184 A1* | 3/2020 | Taubenrauch | F03D 1/00 |
| 2020/0130298 A1* | 4/2020 | Lindeskov | B29D 24/002 |

* cited by examiner

SITE-SPECIFIC CUSTOMIZABLE NACELLE FOR A WIND TURBINE

FIELD

The present disclosure relates generally to wind turbines, and more particularly to a base nacelle design that can be customized via one or more strengthening members to accommodate varying site-specific conditions.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate member support frame located within the nacelle. More specifically, in many wind turbines, the gearbox is mounted to the bedplate member via one or more torque supports or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, the nacelle is formed via a vacuum infusion process with inner and outer skin layers and a core material therebetween. Thus, the premanufactured nacelle generally has a single design to accommodate worse-case global conditions for wind and snow loads at multiple sites. At most, two different nacelle designs are manufactured, including a design for snow load countries and another design for non-snow load countries. In either design, however, the nacelle is manufactured the same way, placing one or more outer skin layers in a mold of the nacelle, placing a core material atop the outer skin layer(s), placing one or more inner skin layers atop the core material, and infusing all of the components together with a resin material. As such, manufacturers and assembly plants have difficulty or are incapable of building and/or assembling more than one nacelle design at a wind turbine site.

In view of the foregoing, the present disclosure is directed to a base nacelle design manufactured without the core material that can be customized via one or more strengthening members to accommodate varying site-specific conditions to avoid overdesigning for sites with low loads.

BRIEF DESCRIPTION

Aspects and advantages of the invention will be set forth in part in the following description, or may be obvious from the description, or may be learned through practice of the invention.

In one aspect, the present disclosure is directed to a nacelle for a wind turbine. The nacelle includes a plurality of walls arranged together to form an inner volume. The walls include a base wall, side walls, a front wall, a rear wall, and a top wall. Each of the walls is constructed of one or more outer skin layers positioned adjacent to one or more inner skin layers and infused together via a resin material. Further, the nacelle includes a plurality of reinforcement members secured to one or more of the plurality of walls on an interior or exterior side of at least one of the one or more outer skin layers or the one or more inner skin layers at locations requiring additional reinforcement. As such, the reinforcement members can be tailored according to a particular wind turbine site.

In one embodiment, the walls may be absent a core material between the outer skin layer(s) and the inner skin layer(s), i.e. the outer and inner skin layers are arranged directly adjacent to each other. In another embodiment, the nacelle may include one or more additional skin layers arranged atop one or more of the plurality of reinforcement members.

In further embodiments, one or more of the plurality of reinforcement members may be arranged parallel to a longitudinal axis of the plurality of walls of the nacelle. Alternatively, one or more of the plurality of reinforcement members may be arranged perpendicular to a longitudinal axis of the plurality of walls of the nacelle.

In additional embodiments, the plurality of reinforcement members may be arranged parallel to a width-wise axis of one of the plurality of walls of the nacelle. Alternatively, one or more of the plurality of reinforcement members may be arranged parallel to a height-wise axis of one of the plurality of walls of the nacelle.

In several embodiments, one or more of the plurality of reinforcement members may intersect each other. Alternatively, one or more of the plurality of reinforcement members may be spaced apart from each other. In yet another embodiment, one or more of the plurality of reinforcement members may extend around one or more corners of the nacelle from one of the plurality of walls to another.

In certain embodiments, one or more of the plurality of reinforcement members may be secured within the inner volume of the nacelle and/or to an exterior surface of the nacelle. In particular embodiments, the plurality of reinforcement members may have a square or rectangular cross-section. In such embodiments, the reinforcement members may be configured as strips or ribs.

In at least one embodiment, the plurality of reinforcement members may be constructed of at least one of a thermoplastic polymer, a thermoset polymer, a foam material, a wood material, a fiber material, or a metal material. In other words, in certain embodiments, the reinforcement members may be constructed of a similar material to that of the core material used in conventional wind turbine designs, but may be isolated to specific locations requiring additional reinforcement, thereby providing a more durable, more cost-effective design that can be tailored for an individual wind turbine site.

In another aspect, the present disclosure is directed to a method of manufacturing a nacelle for a wind turbine. The method includes placing one or more outer skin layers in a mold of the nacelle. The method also includes placing one or more inner skin layers atop the one or more outer skin layers in the mold. Further, the method includes securing a plurality of reinforcement members to an interior or exterior side of at least one of the one or more outer skin layers or the one or more inner skin layers at locations requiring additional reinforcement. Moreover, the method includes infusing the one or more outer skin layers and the one or more inner skin layers together via a resin material so as to form the nacelle. Thus, the final nacelle has a plurality of walls that define an inner volume.

In one embodiment, the method also includes determining the locations requiring additional reinforcement via a computer model that provides a loading profile of the nacelle and securing the plurality of reinforcement members to the interior or the exterior side of at least one of the one or more outer skin layers or the one or more inner skin layers at the locations having the loading above the predetermined threshold based on the loading profile.

In another embodiment, the method may include positioning the one or more outer skin layers adjacent to the one or more inner skin layers without a core material arranged therebetween. In further embodiments, securing the plurality of reinforcement members to the interior or exterior side of at least one of the one or more outer skin layers or the one or more inner skin layers may include at least one of placing one or more additional skin layers atop one or more of the plurality of reinforcement members, bolting the plurality of reinforcement members to the interior or exterior side of at least one of the one or more outer skin layers or the one or more inner skin layers, or bonding the plurality of reinforcement members to the interior or exterior side of at least one of the one or more outer skin layers or the one or more inner skin layers. In certain embodiments, securing the plurality of reinforcement members to the interior or exterior side of at least one of the one or more outer skin layers or the one or more inner skin layers may further include infusing the one or more outer skin layers, the one or more inner skin layers, the plurality of reinforcement members, and the one or more additional skin layers together via the resin material.

In additional embodiments, the method may further include arranging one or more of the plurality of reinforcement members within the mold parallel or perpendicular with respect to a longitudinal axis, a width-wise axis, or a height-wise of one of the plurality of walls of the nacelle.

In yet another embodiment, the method may include arranging one or more of the plurality of reinforcement members within the mold such that they intersect each other. In several embodiments, the method may include arranging one or more of the plurality of reinforcement members within the mold such that the one or more of the plurality of reinforcement members extend around one or more corners of the nacelle from one of the plurality of walls to another. It should be understood that the method may further include any of the additional steps and/or features as described herein.

In yet another aspect, the present disclosure is directed to a method of strengthening a nacelle for a wind turbine at a wind turbine site. The method includes providing a nacelle having a plurality of walls arranged together to form an inner volume. The plurality of walls includes a base wall, side walls, a front wall, a rear wall, and a top wall. Each of the plurality of walls is constructed of one or more outer skin layers positioned adjacent to one or more inner skin layers and infused together via a resin material. The method also includes securing a plurality of reinforcement members to one or more of the plurality of walls on an interior side or an exterior side of at least one of the one or more outer skin layers or the one or more inner skin layers at locations requiring additional reinforcement at the wind turbine site.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
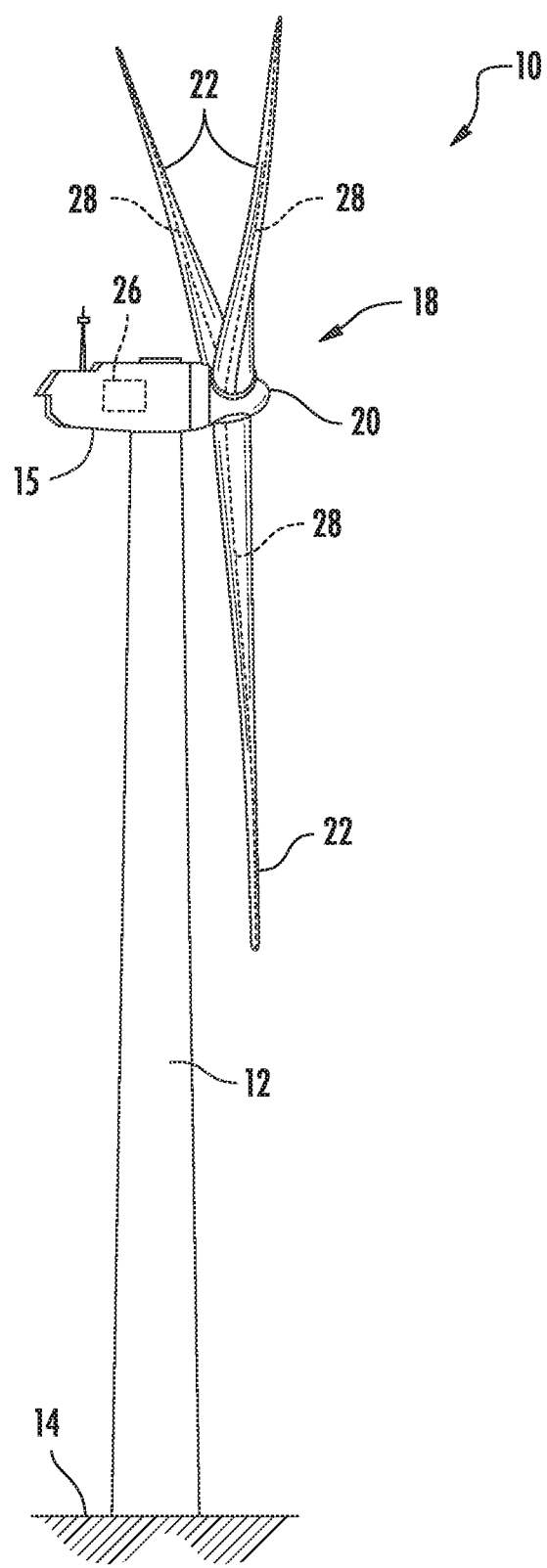
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. More specifically, as shown particularly in FIG. 3, the nacelle 16 may support a bedplate 48 therein. As such, the nacelle 16 corresponds to the overall housing structure and may have a base wall 17, opposing side walls 19, a front wall 21, a rear wall 23, and a top wall or lid 25 that are arranged together to define an inner volume 27. The rotor 18 also includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
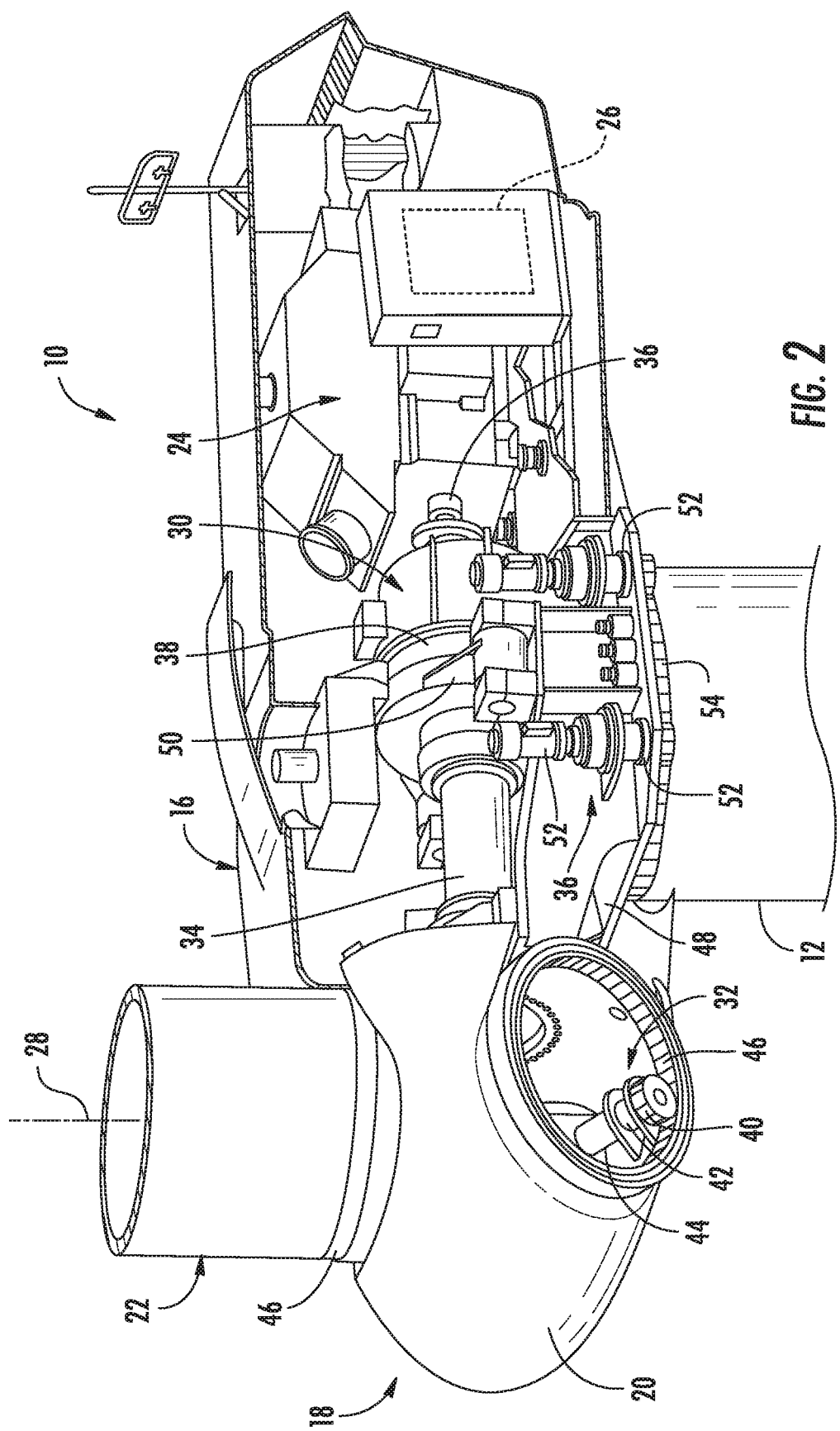
FIG. 2 illustrates a simplified, internal view of one embodiment of a nacelle of a wind turbine according to the present disclosure, particularly illustrating the nacelle during normal operation.
Figure 3:
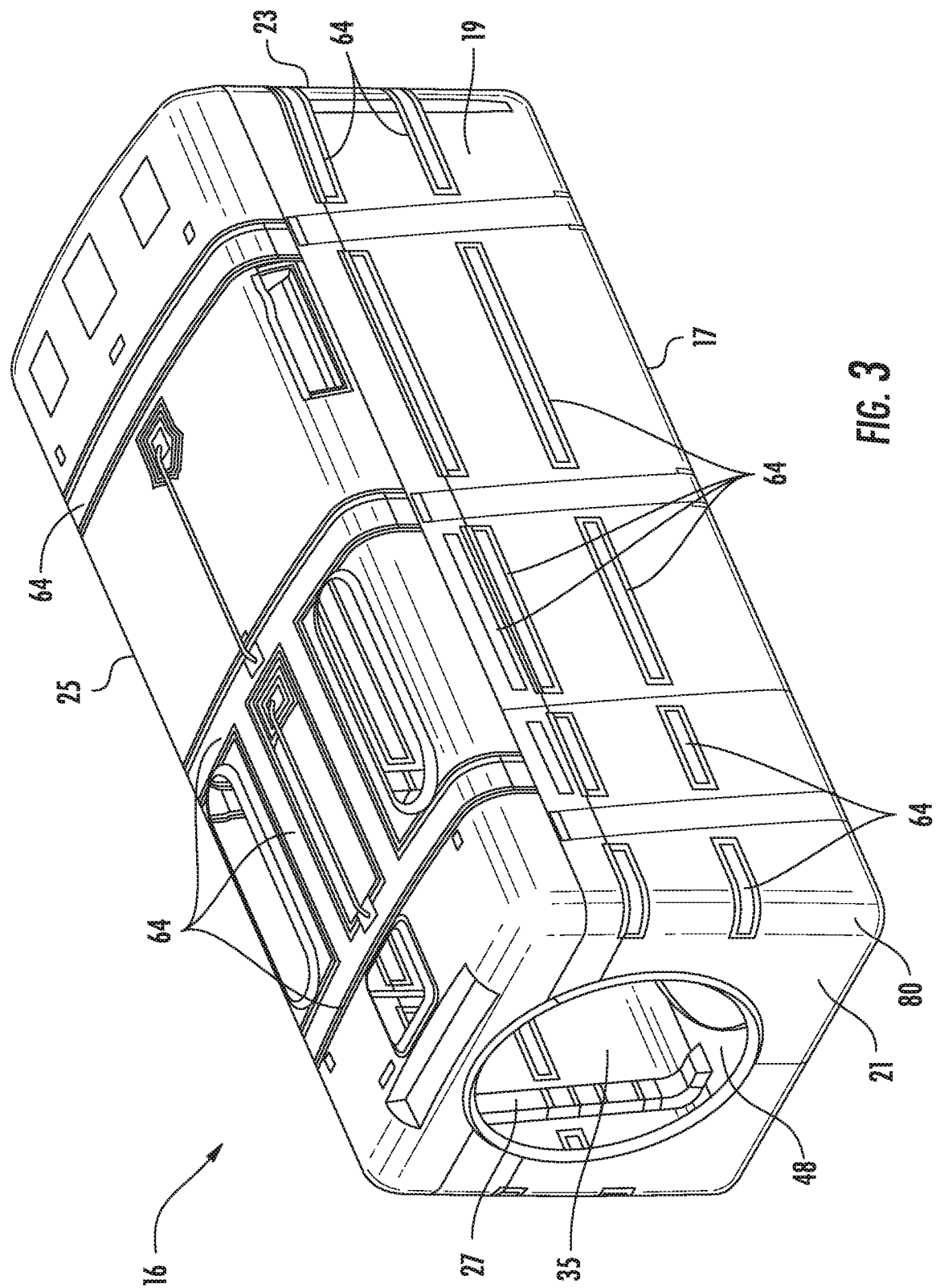
FIG. 3 illustrates a perspective view of one embodiment of a nacelle of a wind turbine according to the present disclosure.
Figure 8:
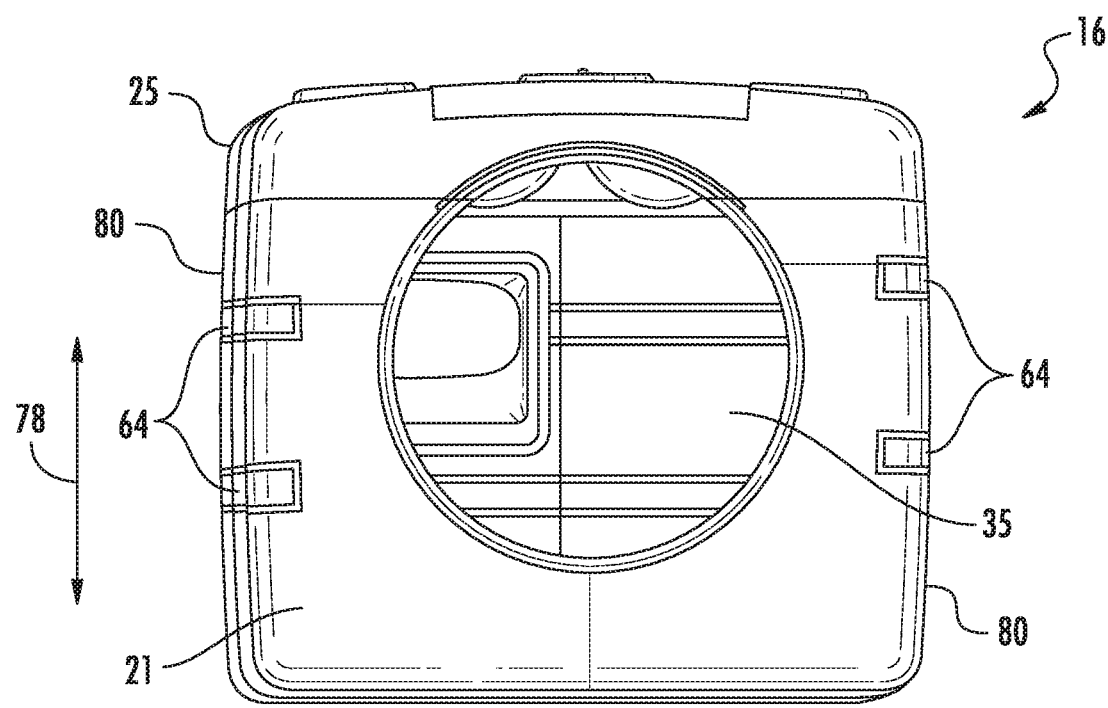
FIG. 8 illustrates a front view of the nacelle of FIG. 3.

Referring now to FIG. 2, a simplified, internal view of one embodiment of the nacelle 16 of the wind turbine 10 shown in FIG. 1, particularly illustrating the drivetrain components thereof, is illustrated. Further, as shown, the generator 24 may be coupled to the rotor 18 for producing electrical power from the rotational energy generated by the rotor 18. The rotor 18 may include a main shaft 34 rotatable via a main bearing (not shown) coupled to the hub 20 for rotation therewith. Further, the main shaft 34 may be received within a front opening 35 of the front wall 21 of the nacelle 16 (FIGS. 3 and 8). The main shaft 34 may, in turn, be rotatably coupled to a gearbox output shaft 36 of the generator 24 through a gearbox 30. The gearbox 30 may include a gearbox housing 38 that is connected to the bedplate 48 by one or more torque arms 50. In other words, the bedplate 48 may be a forged component in which the main bearing (not shown) is seated and through which the main shaft 34 extends. As is generally understood, the main shaft 34 provides a low speed, high torque input to the gearbox 30 in response to rotation of the rotor blades 22 and the hub 20. Thus, the gearbox 30 thus converts the low speed, high torque input to a high speed, low torque output to drive the gearbox output shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 52 communicatively coupled to the controller 26, with each yaw drive mechanism(s) 52 being configured to change the angle of the nacelle 16 relative to the wind (e.g., by engaging a yaw bearing 54 of the wind turbine 10). The yaw bearing may be arranged within, for example, an opening within the bottom wall 17 of the nacelle 16 (FIG. 6).

Figure 4:
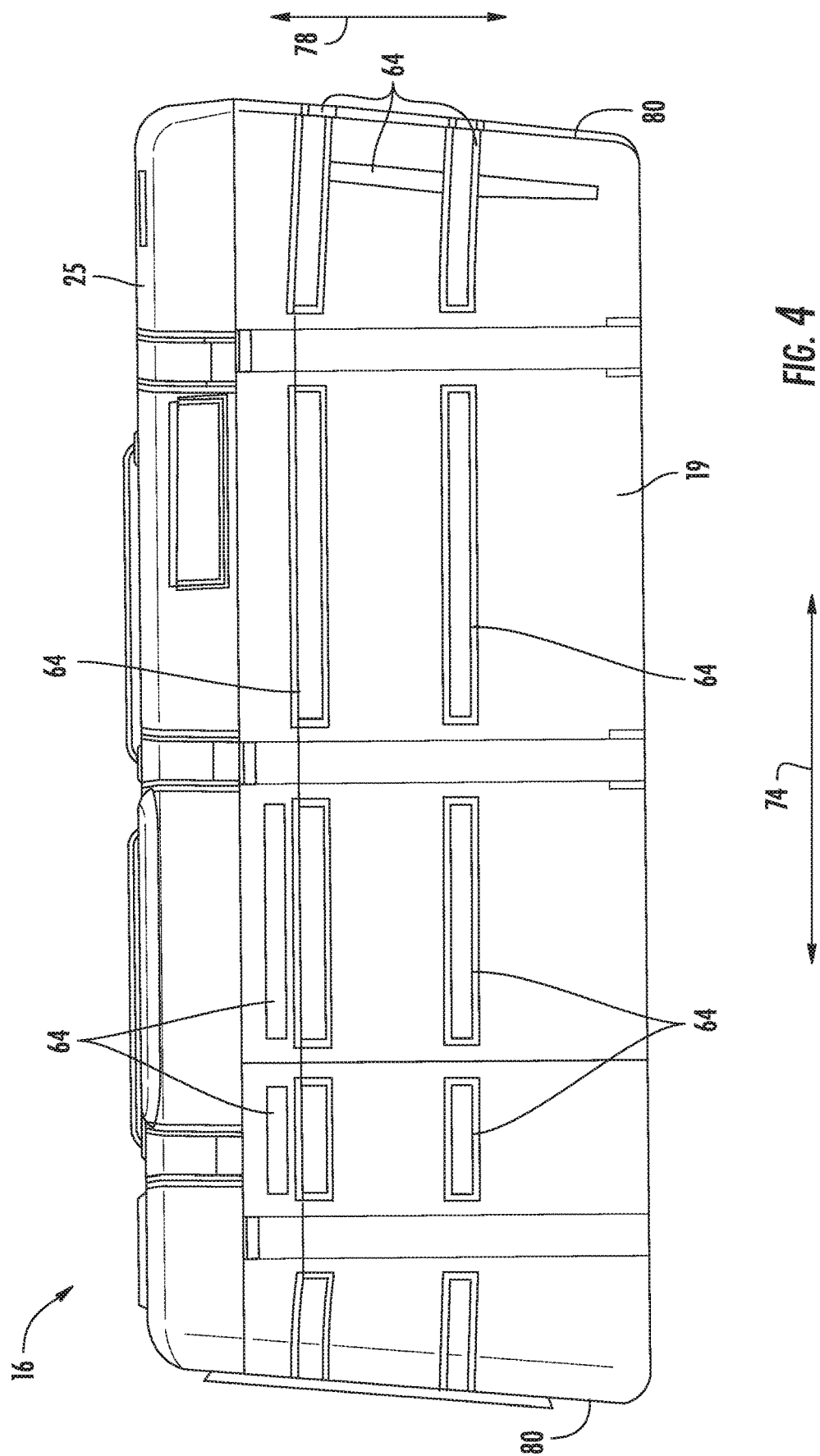
FIG. 4 illustrates a side view of the nacelle of FIG. 3.
Figure 5:
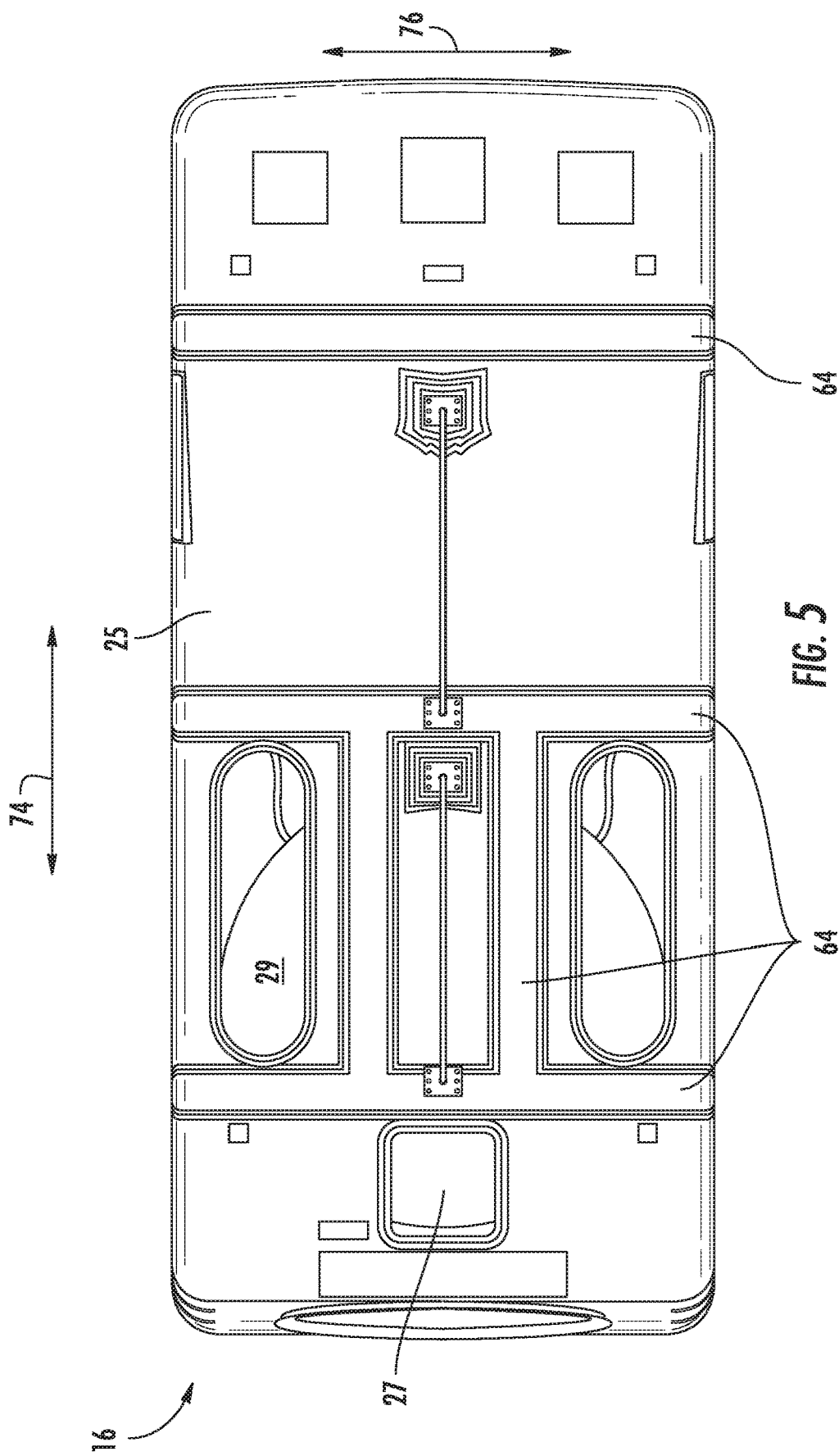
FIG. 5 illustrates a top view of the nacelle of FIG. 3.
Figure 6:
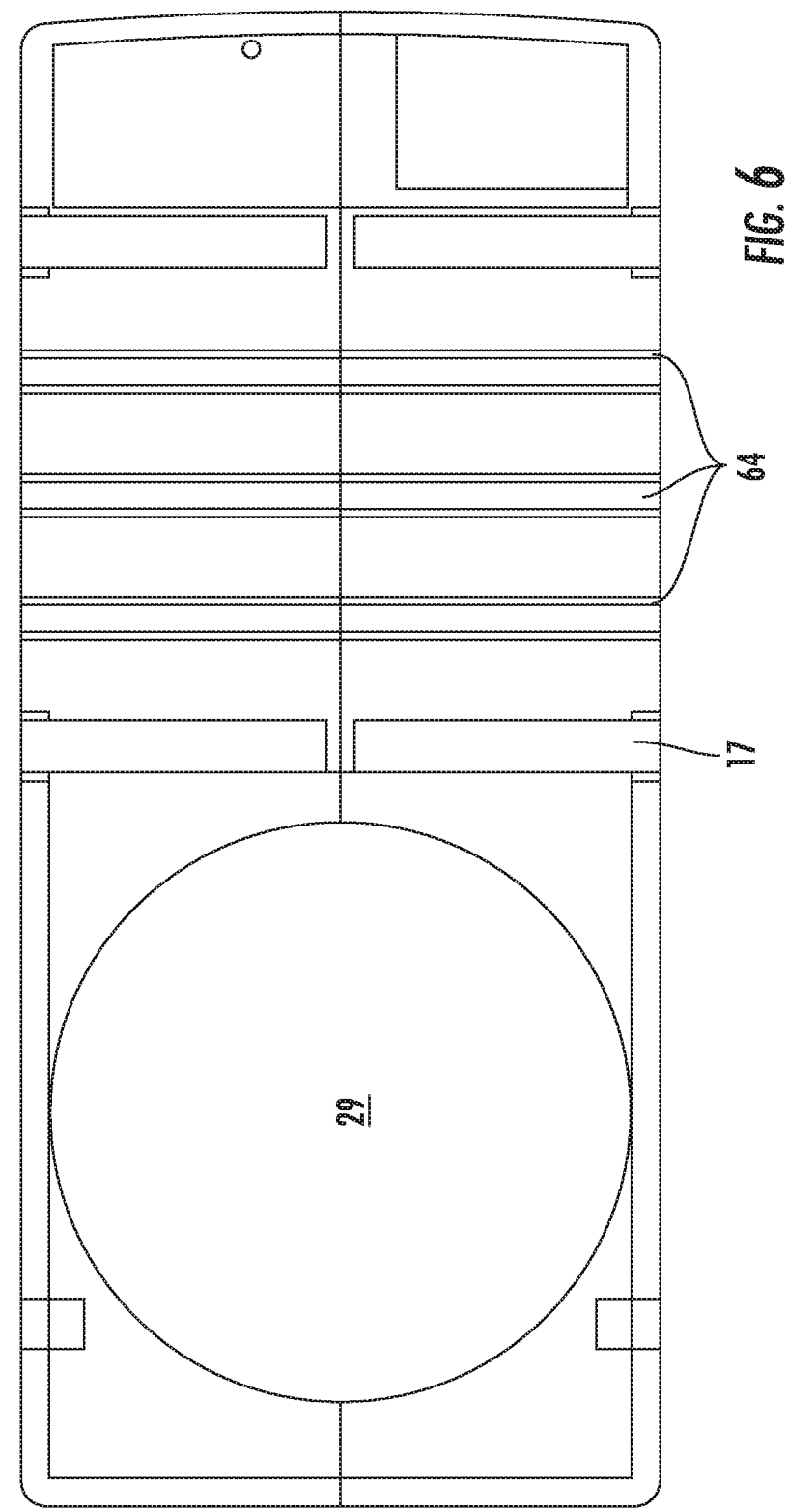
FIG. 6 illustrates a bottom view of the nacelle of FIG. 3.
Figure 7:
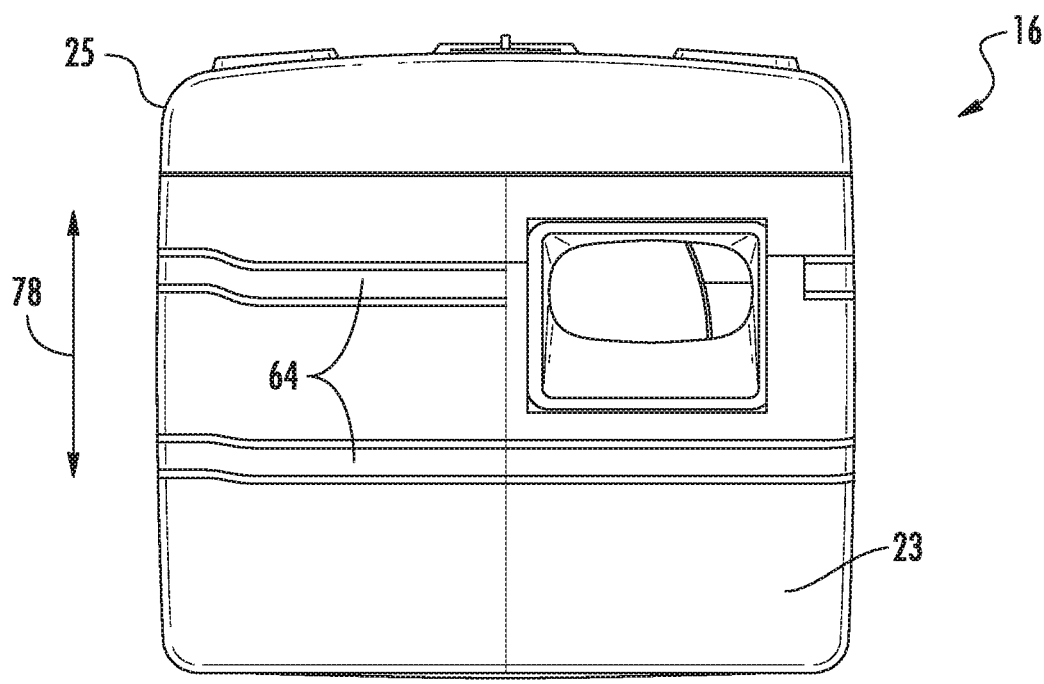
FIG. 7 illustrates a back view of the nacelle of FIG. 3.

Referring now particularly to FIGS. 3-8, various views of the nacelle 16 of the wind turbine 10 according to the present disclosure are illustrated. As mentioned, FIG. 3 illustrates a perspective view of one embodiment of the nacelle 16 according to the present disclosure. FIG. 4 illustrates a side view of the nacelle 16 illustrated in FIG. 3. FIG. 5 illustrates a top view of the nacelle 16 illustrated in FIG. 3. FIG. 6 illustrates a bottom view of the nacelle 16 illustrated in FIG. 3. FIG. 7 illustrates a back view of the nacelle 16 illustrated in FIG. 3. FIG. 8 illustrates a front view of the nacelle 16 illustrated in FIG. 3.

Figure 9:
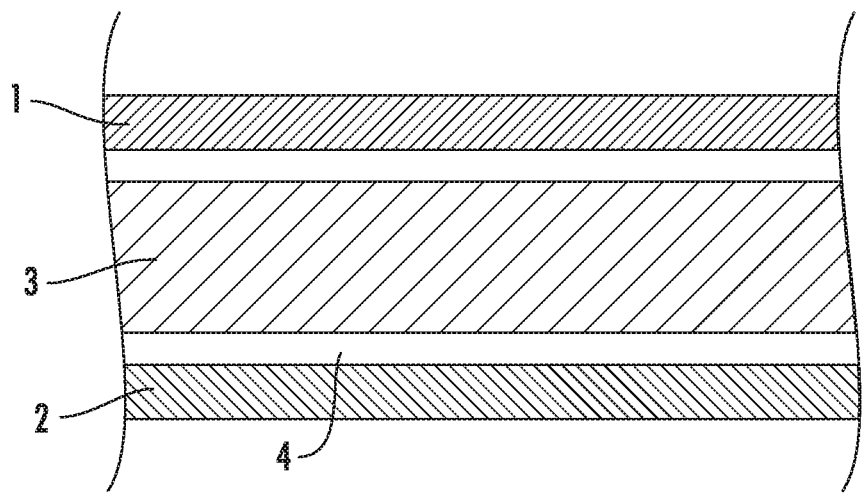
FIG. 9 illustrates a schematic, cross-sectional view of a nacelle wall according to conventional construction.

Conventionally, as shown in FIG. 9, wind turbine nacelles are formed via an infusion process, whereby a core material 3 is sandwiched between outer and inner skin layers 1, 2, and the sandwiched configured is secured together via a resin material 4. As such, the core material 3 is present throughout the entire nacelle structure to accommodate worse-case conditions for wind and snow loads. Understandably, providing the core material 3 throughout the entirety of the structure increases costs and overcompensates for wind and snow in regions where increased wind speeds and/or snow is not present.

Figure 10:
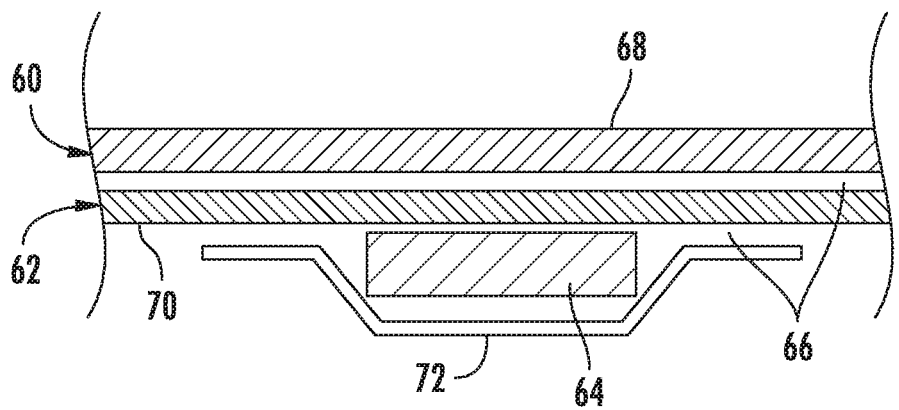
FIG. 10 illustrates a schematic, cross-sectional view of one embodiment of a nacelle wall according to the present disclosure.

Thus, as shown in FIG. 10, the nacelle walls of the present disclosure eliminate the core material 3 and use strategically placed reinforcement members 64 through the nacelle body. More specifically, as shown, each of the walls is constructed of one or more outer skin layers 60 positioned adjacent to one or more inner skin layers 62 and infused together via a resin material 66. For example, as shown, due to the absence of the core material 3, the outer and inner skin layers 60, 62 are arranged directly adjacent to each other. Further, the reinforcement members 64 are secured to interior or exterior sides 68, 70 of the outer skin layer(s) 60 and/or the inner skin layer(s) 62 at locations requiring additional reinforcement. In addition, the reinforcement members 64 may be secured within the inner volume 27 of the nacelle 16 and/or to an exterior surface of the nacelle 16. As such, the reinforcement members 64 can be tailored according to a particular wind turbine site.

In at least one embodiment, the reinforcement members 64 may be constructed of at least one of a thermoplastic polymer, a thermoset polymer, a foam material, a wood material, a fiber material, or a metal material. For example, in certain embodiments, the reinforcement members 64 may be constructed of polyethylene terephthalate (PET) or polyvinyl chloride (PVC). In other words, in certain embodiments, the reinforcement members 64 may be constructed of a similar material to that of the core material 3, but may be isolated to specific locations requiring additional reinforcement, thereby providing a more durable, more cost-effective design that can be tailored for an individual wind turbine site. In another embodiment, the reinforcement member(s) 64 may be pultruded rods. In yet another embodiment, the reinforcement member(s) 64 may be a stack of fiber material layers that can have any suitable thickness. In such embodiments, the fiber material may include glass fibers, carbon fibers, polymer fibers, wood fibers, bamboo fibers, ceramic fibers, nanofibers, metal fibers, and/or combinations thereof. Further, the stack of fiber material layers may be formed in a separate mold (i.e. by arranging the stack of fiber material layers in a mold and infusing the stack of fiber material layers together via a resin material) and then subsequently secured to one or more locations on the nacelle walls.

In addition, as shown in the illustrated embodiment, the nacelle wall may include one or more additional skin layers 72 arranged atop one or more of the reinforcement members 64. In such embodiments, the outer skin layer(s) 60, the inner skin layer(s) 62, the reinforcement members 64, and the additional skin layer(s) 72 may be infused together via the resin material 66. Alternatively, the additional skin layer(s) 72 may be omitted and the reinforcement members

64 may be secured to the nacelle walls using any other suitable attachment methods, such as bonding, bolting, additive manufacturing, combinations thereof, and/or any other suitable attachment techniques.

In particular embodiments, as shown, the reinforcement members 64 may have a square or rectangular cross-section. In such embodiments, the reinforcement members 64 may be configured as strips or ribs. Thus, as shown in FIGS. 3 and 4, one or more of the reinforcement members 64 may be arranged parallel to a longitudinal axis 74 of the plurality of walls of the nacelle 16. Alternatively, as shown particularly in FIGS. 5 and 6, one or more of the plurality of reinforcement members may be arranged perpendicular to the longitudinal axis 74 of the plurality of walls of the nacelle 16. In additional embodiments, as shown in FIGS. 7 and 8, the reinforcement members 64 may be arranged parallel to a width-wise axis 76 of one of the plurality of walls of the nacelle 16. Alternatively, one or more of the reinforcement members 64 may be arranged parallel to a height-wise axis 78 of one of the plurality of walls of the nacelle 16.

Referring particularly to FIGS. 3-5, one or more of the reinforcement members 64 may intersect each other. Alternatively, as shown, at least some of the reinforcement members 64 may be spaced apart from each other. In yet another embodiment, as shown in FIGS. 3, 4, 7, and 8, one or more of the reinforcement members 64 may extend around one or more corners 80 of the nacelle 16 from one of the plurality of walls to another.

Figure 11:
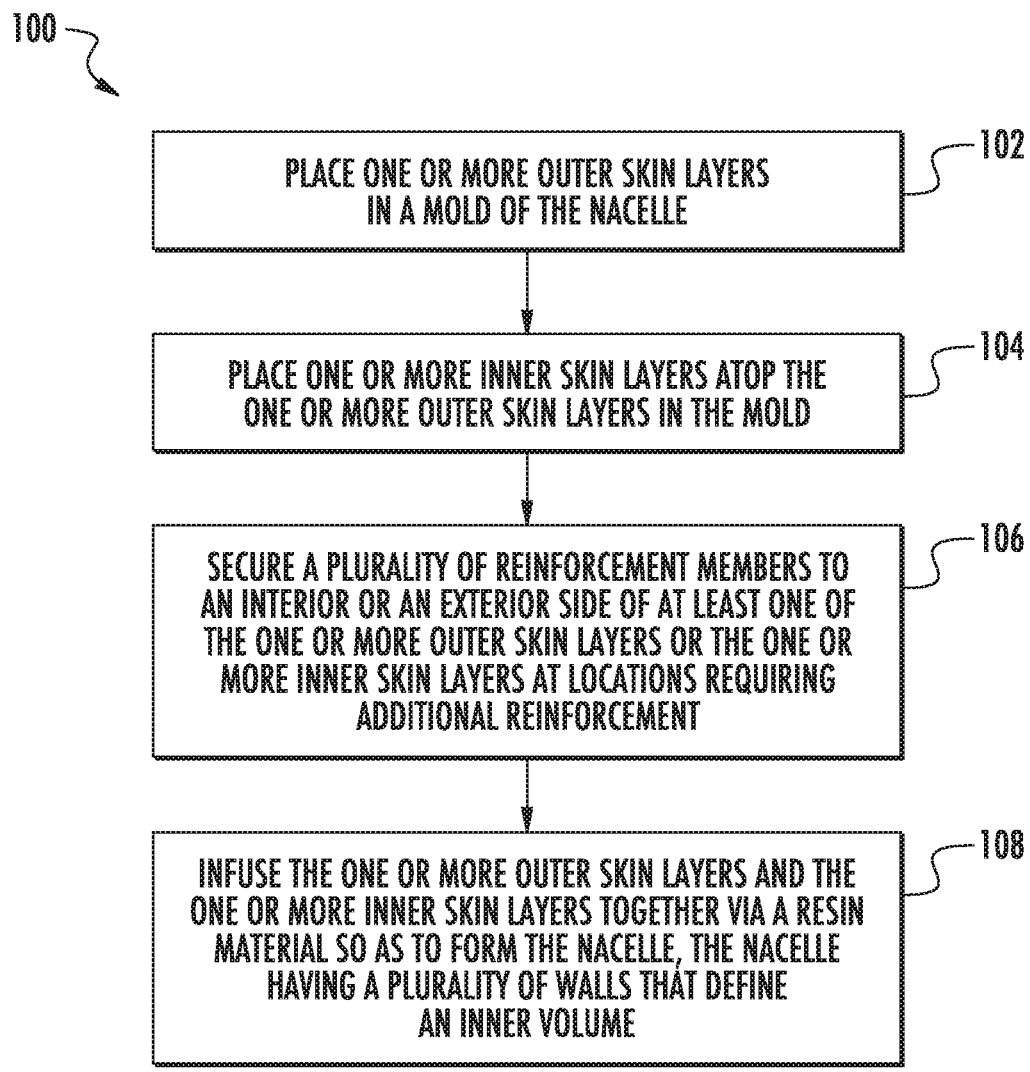
FIG. 11 illustrates a flow diagram of one embodiment of a method for manufacturing a nacelle of a wind turbine according to the present disclosure.

Referring now to FIG. 11, a flow diagram of one embodiment of a method 100 of manufacturing a nacelle for a wind turbine is illustrated. The method 100 may be implemented to manufacture, for instance, the nacelle 16 discussed above with reference to FIGS. 1-10. FIG. 11 depicts steps performed in a particular order for purposes of illustration and discussion. Those of ordinary skill in the art, using the disclosures provided herein, will understand that various steps of the method 100 or any of the other methods disclosed herein may be adapted, modified, rearranged, performed simultaneously or modified in various ways without deviating from the scope of the present disclosure.

As shown at (102), the method 100 includes placing one or more outer skin layers 60 in a mold of the nacelle 16. As shown at (104), the method 100 includes placing one or more inner skin layers 62 atop the outer skin layer(s) 60 in the mold. For example, in one embodiment, the method 100 may include positioning the outer skin layer(s) 60 adjacent to the inner skin layer(s) 62 without the core material 3 arranged therebetween.

As shown at (106), the method 100 includes securing a plurality of reinforcement members 64 to an interior or an exterior side 68, 70 of the outer skin layer(s) 60 and/or the inner skin layer(s) 64 at locations requiring additional reinforcement. For example, in one embodiment, the reinforcement members 64 may be secured to the interior or exterior side 68, 70 of the outer skin layer(s) 60 and/or the inner skin layer(s) 64 by placing one or more additional skin layers 72 atop one or more of the reinforcement members 64 that can be subsequently infused. In additional embodiments, the method 100 may further include arranging one or more of the reinforcement members 64 within the mold parallel and/or perpendicular with respect to the longitudinal axis 74, the width-wise axis 76, and/or the height-wise 78 of one of the plurality of walls of the nacelle 16. In another embodiment, the method 100 may include arranging one or more of the reinforcement members 64 within the mold such that they intersect each other. Further, in certain embodiments, the method 100 may include arranging one or more of the reinforcement members 64 within the mold such that one or more of the reinforcement members 64 extend around one or more corners 80 of the nacelle 16 from one of the plurality of walls to another. In other words, the strength of the nacelle 16 can be easily customized with any suitable pattern or arrangement of the reinforcement members 64, with the pattern varying per wind turbine site as needed.

More specifically, as shown at (108), the method 100 includes infusing the outer skin layer(s) 60 and the inner skin layer(s) 62 together via a resin material 66 so as to form the nacelle 16. Thus, the final nacelle 16 has a plurality of walls that define an inner volume 27. In particular embodiments, the method 100 may include infusing the outer skin layer(s) 60, the inner skin layer(s) 62, the reinforcement member(s) 64, and the additional skin layers 72 together via the resin material 66.

In additional embodiments, the method 100 may also include determining the locations requiring additional reinforcement via a computer model that provides a loading profile of the nacelle 16. For example, in certain embodiments, a controller or computer system may generate the computer model of the loading profile using finite element analysis (FEM). In still further embodiments, the loading profile may be generated or determined using any other suitable model, mathematical equations, formulas, analysis, and/or combinations thereof.

As such, the method 100 may further includes securing the reinforcement members 64 to the interior or exterior sides 68, 70 of the outer skin layer(s) 60 or the inner skin layer(s) 62 at locations having a loading or experiencing a loading above a predetermined threshold based on the loading profile. In other words, the loading profile or model may generate a representation of the nacelle 16 that depicts areas of the nacelle 16 experiencing loading above a certain threshold. As such, the reinforcement members 64 can be strategically placed at such locations, rather than including the core material 3 throughout the entire nacelle 16.

Figure 12:
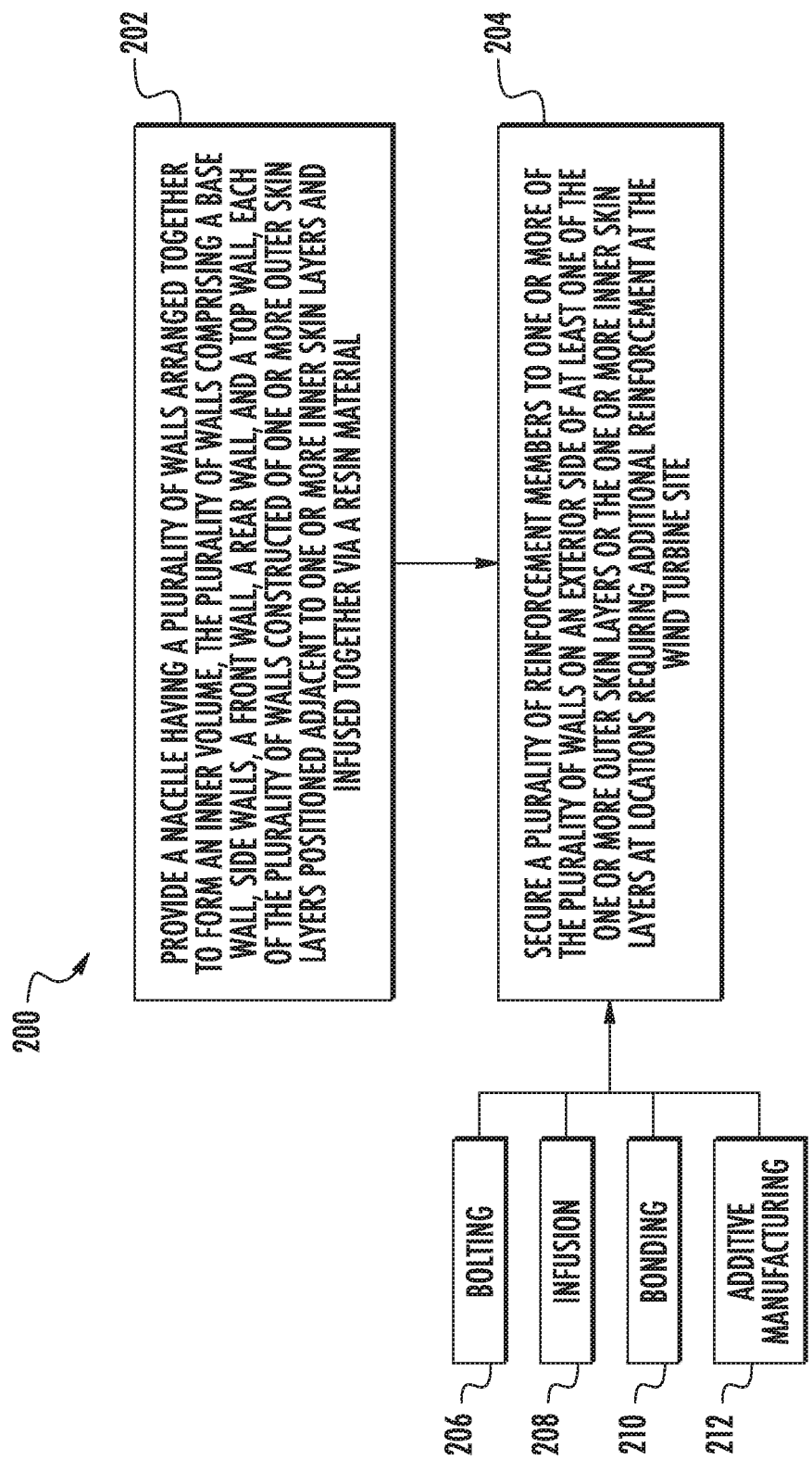
FIG. 12 illustrates a flow diagram of one embodiment of a method of strengthening a nacelle for a wind turbine at a wind turbine site according to the present disclosure.

Referring now to FIG. 12, a flow diagram of one embodiment of a method 200 of strengthening a nacelle for a wind turbine for a particular wind turbine site is illustrated. The method 200 may be implemented to strengthen, for instance, the nacelle 16 discussed above with reference to FIGS. 1-10. FIG. 12 depicts steps performed in a particular order for purposes of illustration and discussion. Those of ordinary skill in the art, using the disclosures provided herein, will understand that various steps of the method 200 or any of the other methods disclosed herein may be adapted, modified, rearranged, performed simultaneously or modified in various ways without deviating from the scope of the present disclosure.

As shown at (202), the method 200 includes providing the nacelle having the plurality of walls arranged together to form the inner volume. As mentioned, the walls may include a base wall, side walls, a front wall, a rear wall, and a top wall. Each of the walls is constructed of one or more outer skin layers positioned adjacent to one or more inner skin layers and infused together via a resin material. As shown at (204), the method 200 includes securing a plurality of reinforcement members to one or more of the plurality of walls on an interior or exterior side of at least one of the one or more outer skin layers or the one or more inner skin layers at locations requiring additional reinforcement at the wind turbine site. For example, in such embodiments, as shown, the reinforcement members 64 may be secured to one or more of the nacelle walls via bolting 206, infusion 208, bonding 210, additive manufacturing 212, combinations thereof, and/or any other suitable attachment techniques.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A nacelle for a wind turbine, comprising:
   a plurality of walls arranged together to form an inner volume, the plurality of walls comprising a base wall, side walls, a front wall, a rear wall, and a top wall, each of the plurality of walls constructed of one or more outer skin layers positioned adjacent to one or more inner skin layers and infused together via a resin material; and,
   a plurality of reinforcement members secured to one or more of the plurality of walls on an interior side or an exterior side of at least one of the one or more outer skin layers or the one or more inner skin layers at locations requiring additional reinforcement,
   wherein the plurality of walls are absent a core material between the one or more outer skin layers and the one or more inner skin layers.

2. The nacelle of claim 1, further comprising one or more additional skin layers arranged atop one or more of the plurality of reinforcement members.

3. The nacelle of claim 1, wherein one or more of the plurality of reinforcement members is arranged parallel to a longitudinal axis of the plurality of walls of the nacelle.

4. The nacelle of claim 1, wherein one or more of the plurality of reinforcement members is arranged perpendicular to a longitudinal axis of the plurality of walls of the nacelle.

5. The nacelle of claim 1, wherein one or more of the plurality of reinforcement members is arranged parallel to a width-wise axis of one of the plurality of walls of the nacelle.

6. The nacelle of claim 1, wherein one or more of the plurality of reinforcement members is arranged parallel to a height-wise axis of one of the plurality of walls of the nacelle.

7. The nacelle of claim 1, wherein one or more of the plurality of reinforcement members intersect each other.

8. The nacelle of claim 1, wherein one or more of the plurality of reinforcement members extend around one or more corners of the nacelle from one of the plurality of walls to another.

9. The nacelle of claim 1, wherein one or more of the plurality of reinforcement members are secured within the inner volume of the nacelle and/or to an exterior surface of the nacelle.

10. The nacelle of claim 1, where the plurality of reinforcement members comprise at least one of a square or rectangular cross-section.

11. The nacelle of claim 1, wherein the plurality of reinforcement members are constructed of at least one of a thermoplastic polymer, a thermoset polymer, a foam material, a wood material, a fiber material, or a metal material.

12. A method of manufacturing a nacelle for a wind turbine, the method comprising:
   placing one or more outer skin layers in a mold of the nacelle;
   placing one or more inner skin layers atop the one or more outer skin layers in the mold without a core material arranged therebetween;
   securing a plurality of reinforcement members to an interior side or an exterior side of at least one of the one or more outer skin layers or the one or more inner skin layers at locations requiring additional reinforcement; and,
   infusing the one or more outer skin layers and the one or more inner skin layers together via a resin material so as to form the nacelle, the nacelle having a plurality of walls that define an inner volume.

13. The method of claim 12, further comprising:
   determining the locations requiring additional reinforcement via a computer model that provides a loading profile of the nacelle; and,
   securing the plurality of reinforcement members to the interior or exterior sides of at least one of the one or more outer skin layers or the one or more inner skin layers at the locations having the loading above a predetermined threshold based on the loading profile.

14. The method of claim 12, wherein securing the plurality of reinforcement members to the interior or exterior sides of at least one of the one or more outer skin layers or the one or more inner skin layers further comprises at least one of placing one or more additional skin layers atop one or more of the plurality of reinforcement members, bolting the plurality of reinforcement members to the interior or exterior sides of at least one of the one or more outer skin layers or the one or more inner skin layers, or bonding the plurality of reinforcement members to the interior or exterior sides of at least one of the one or more outer skin layers or the one or more inner skin layers.

15. The method of claim 14, further comprising infusing the one or more outer skin layers, the one or more inner skin layers, the plurality of reinforcement members, and the one or more additional skin layers together via the resin material.

16. The method of claim 12, further comprising arranging one or more of the plurality of reinforcement members within the mold parallel or perpendicular with respect to a longitudinal axis, a width-wise axis, or a height-wise of one of the plurality of walls of the nacelle.

17. The method of claim 12, further comprising arranging one or more of the plurality of reinforcement members within the mold such that they intersect each other.

18. A method of strengthening a nacelle for a wind turbine for a particular wind turbine site, the method comprising:
   providing a nacelle having a plurality of walls arranged together to form an inner volume, the plurality of walls comprising a base wall, side walls, a front wall, a rear wall, and a top wall, each of the plurality of walls constructed of one or more outer skin layers positioned adjacent to one or more inner skin layers and infused together via a resin material without a core material arranged therebetween; and,
   securing a plurality of reinforcement members to one or more of the plurality of walls on an interior side or an exterior side of at least one of the one or more outer skin layers or the one or more inner skin layers at locations requiring additional reinforcement at the wind turbine site.

* * * * *